United States Patent Office 3,275,678
Patented Sept. 27, 1966

3,275,678
MIXED ESTERS OF POLYCARBOXYLIC ACIDS (25% AROMATIC DICARBOXYLIC) WITH ETHYLENE OXIDE ADDUCT
Carl Bernstein, Deerfield, and Kermit Longley, Park Forest, Ill., assignors to Witco Chemical Company, Inc., New York, N.Y., a corporation of Delaware
No Drawing. Filed Sept. 13, 1962, Ser. No. 223,545
5 Claims. (Cl. 260—475)

This application is a continuation-in-part of application Serial No. 808,315, filed April 23, 1959, now abandoned.

Our invention is concerned with novel esters which have various uses but which have particular utility for the production of rigid polyurethane foams.

Esters used in the production of rigid polyurethane foams are described in numerous patents and publications illustrative of which are U.S. Patents Nos. 2,806,835; 2,806,836; 2,811,493; 2,836,575 and 2,846,408. The usual esters are made by reacting a dicarboxylic acid, preferably adipic acid, and a triol such as trimethylolpropane (TMP). A variant form comprises replacing about 15% by weight of the adipic acid with phthalic anhydride. Since phthalic anhydride is materially cheaper than adipic acid, and since esters utilizing phthalic anhydride exhibit better properties, particularly when foamed with fluorohydrocarbon inert gases such as Freon 11, Genstron 11, and Isotron 11 (as described, for instance, in Union of South Africa Patent No. 3329/56), and since the resulting foams retain such gases for longer periods of time than where adipic acid alone is used in the production of the esters, it is highly desirable to be able to employ as much phthalic anhydride as possible in the preparation of the esters. Unfortunately, however, when adipic acid is replaced by phthalic anhydride, the resulting ester products are considerably more viscous than in the case where adipic acid is utilized as the polycarboxylic acid constituent of the esters. While efforts have heretofore been made, therefore, to attempt to utilize as much phthalic anhydride as possible in place of adipic acid, in general, only very minor proportions of phthalic anhydride, generally not more than about 25% by weight of the mixture of adipic acid and phthalic anhydride can be utilized with reasonable satisfaction for the production of the esters used for the manufacture of rigid foams.

The problems involved in the production of satisfactory esters, particularly for utilization in the manufacture of rigid foams, are of multiple character. Not only is there the aspect of cost involved but, also, there are problems relating to viscosities, good water resistance, and good retention of the gases which are utilized in the production of the foams, particularly the inert fluorohydrocarbons. To attempt to meet the problems, various approaches have been suggested. Certain of them have involved the production of ethers. Various of the ether-type materials, although producing rigid foams, produce foams which are friable unless cured at elevated temperatures for a short time or at room temperature for extended periods. In any event, no adequately satisfactory solution has been found to meet the several problems involved.

We have discovered new and highly useful esters, in the form of polyesters, which are very inexpensive to manufacture and which, if used to produce rigid polyurethane foams, result in such foams with highly satisfactory properties for the uses to which such foams are conventionally placed, as, for instance, as insulating materials in the refrigeration industry. The esters, made in accordance with our invention, can utilize phthalic anhydride entirely as the polycarboxylic acid reactant or, if desired, upwards of 25% of the total polycarboxylic acid utilized in the production of the esters can be phthalic anhydride.

In order to achieve this result, we have found that the polyol, or aliphatic polyhydric alcohol containing from 3 to 6 hydroxyl groups, with which the polycarboxylic acid is reacted to produce the ester, should be in the form of an ethylene oxide adduct of the polyol in which the ethylene oxide content is controlled within certain narrow ranges. More specifically, we have found that the ethylene oxide adduct of the polyol must be of such character that, for each mol of said polyol, which in the usual case will be an aliphatic polyhydric alcohol containing from 3 to 6 carbon atoms, such a number of mols of ethylene oxide is reacted therewith as to produce an adduct which contains from 10 to 20 milli-equivalents, per gram, of hydroxyl groups. In addition, we have found that, in order to achieve the best results in accordance with our invention, said ester should have an hydroxyl number between about 280 and about 550 and, more particularly, from about 320 to about 500.

Various aliphatic polyhydric alcohols or polyols, containing from 3 to 6 carbon atoms, can be utilized as the starting material with which the ethylene oxide is reacted to produce the adducts with which the polycarboxylic acids are then reacted to produce the esters. Among such aliphatic polyhydric alcohols are, for instance, glycerol, trimethylolpropane, triethylolpropane, trimethylolethane, triethanolamine, hexanetriols, pentaerythritol, dipentaerythritol, polyglycerols such as diglycerol, triglycerol, tetraglycerol and higher polyglycerols and mixtures thereof, sorbitol, mannitol, and the like.

The ethylene oxide content in the adducts of the polyols will vary depending upon the number of hydroxyl groups present in the polyol. Thus, for example, in the case of trimethylolpropane, for each mol of the trimethylolpropane the ethylene oxide content of the adduct is from about 0.5 mol to not substantially in excess of 3 mols. In the case of sorbitol, for each mol thereof present in an adduct with ethylene oxide, the number of mols of ethylene oxide will range from about 3 mols to about 8 mols. The governing criterion in this regard, however, as stated previously, is that the adduct contains from 10 to 20 milli-equivalents, per gram, of hydroxyl groups.

It has been found, surprisingly, as has been indicated above, that, when adducts of the character described above are esterified with phthalic anhydride or with mixtures of adipic acid and phthalic anhydride in which the phthalic anhydride content is at least 25% of the total of the mixture of adipic acid and phthalic anhydride, esters are obtained having unusually relatively low viscosities. The maximum viscosity of the esters with which the present invention deals are those of about 300,000 cps. at 25 degrees C. In general, however, it will be found that the viscosities of the esters of the present invention are materially below this upper figure and more commonly will be in the range of about 20,000 to about 150,000 cps. at 25 degrees C.

Although the practice of our invention finds its greatest utility in those instances in which phthalic anhydride constitutes the sole polycarboxylic acid used in the production of the esters or constitutes at least 25% and preferably at least 40% of the total of the polycarboxylic acid utilized in the esterification reaction to produce the esters, it will be understood, that, in its broader aspects, our invention contemplates the utilization of other aromatic polycarboxylic acids in place of or in conjunction with phthalic anhydride as, for instance, terephthalic acid, isophthalic acid, trimellitic acid, chlorendic anhydride and chlorendic acid, and naphthalene dicarboxylic acid. It also contemplates the employment, in place of adipic acid, of ether aliphatic polycarboxylic acids which have been conventionally used in the production of esters for the manufacture of rigid polyurethane foams as disclosed, for instance, in various of the patents mentioned herein. However, the employment of adipic acid and dimeric acids such as those sold under the designation 3065–S (Emery Industries) as the aliphatic polycarboxylic acid, in those instances in which an aliphatic polycarboxylic acid is utilized, is particularly preferred.

It will, of course, be understood that mixtures of any two or more of the aforementioned or other aliphatic polyhydric alcohols and mixtures of any two or more of any of the aforementioned or other polycarboxylic acids can be utilized in the practice of our invention.

The following examples are illustrative of the production of esters made in accordance with our invention. It will be understood that numerous other esters can readily be produced following the guidances and teachings disclosed herein without in any way departing from the principles of our invention.

EXAMPLE 1

2 mols of an adduct of 1 mol of TMP with 1.76 mols of ethylene oxide are esterified with 0.5 mol of adipic acid and 0.5 mol of phthalic anhydride. The resulting ester, having an acid number of 1.5 and an hydroxyl number of 404, has an unusually low viscosity, namely, about 22,000 cps. (25 degrees C.).

EXAMPLE 2

2 mols of an adduct of 1 mol of TMP with 1.76 mols of ethylene oxide are esterified with 1 mol of phthalic anhydride. The resulting ester, having an acid number of 1.5 and an hydroxyl number of 385, has a comparatively low viscosity, namely, about 100,000 cps. (25 degrees C.).

EXAMPLE 3

2 mols of an adduct of 1 mol of sorbitol with 6 mols of ethylene oxide are esterified with 0.5 mol of adipic acid and 1 mol of phthalic anhydride.

EXAMPLE 4

2 fols of an adduct of 1 mol of pentaerythritol with 3 mols of ethylene oxide are esterified with 0.5 mol of isophthalic acid and 0.5 mol of adipic acid.

EXAMPLE 5

2 mols of an adduct of 1 mol of trimethylolethane with 2.5 mols of ethylene oxide are esterified with 0.75 mol of adipic acid and 0.5 mol of phthalic anhydride.

EXAMPLE 6

1 mol of an adduct of 1 mol of TMP with 1.75 mols of ethylene oxide are esterified with 0.5 mol phthalic anhydride at a temperature of 225–250 degrees C. in an inert gas atmosphere. The resulting ester has an acid number of 1.5 and an hydroxyl number of 402.

EXAMPLE 7

1 mol of an adduct of 1 mol of TMP with 1.75 mols of ethylene oxide are esterified with 0.25 mol adipic acid and 0.25 mol of phthalic anhydride at a temperature of 225–250 degrees C. in an inert gas atmosphere. The resulting ester has an acid number of 1.5 and an hydroxyl number of 404.

EXAMPLE 8

1 mol of an adduct of 1 mol of TMP with 1.75 mols of ethylene oxide are esterified with 0.5 mol isophthalic acid at a temperature of 225–250 degrees C. in an inert gas atmosphere. The resulting ester has an acid number of 0.2 and an hydroxyl number of 398.

EXAMPLE 9

1 mol of an adduct of 1 mol of TMP with 2.41 mols of ethylene oxide are esterified with 0.5 mol of phthalic anhydride at a temperature of 225–250 degrees C. in an inert gas atmosphere. The resulting ester has an acid number of 1.6 and an hydroxyl number of 365.

EXAMPLE 10

1 mol of an adduct of 1 mol of TMP with 2.41 mols of ethylene oxide are esterified with 0.58 mol phthalic anhydride at a temperature of 225–250 degrees C. in an inert gas atmosphere. The resulting ester has an acid number of 1.7 and an hydroxyl number of 325.

EXAMPLE 11

1 mol of an adduct of 1 mol of TMP with 1.97 mols of ethylene oxide are esterified with 0.5 mol of phthalic anhydride at a temperature of 225–250 degrees C. in an inert gas atmosphere. The resulting ester has an acid number of 1.1 and an hydroxyl number of 386.

EXAMPLE 12

1 mol of an adduct of 1 mol of glycerol with 2.07 mols of ethylene oxide are esterified with 0.5 mol phthalic anhydride at a temperature of 225–250 degrees C. in an inert gas atmosphere. The resulting ester has an acid number of 1.2 and an hydroxyl number of 450.

EXAMPLE 13

252 g. of an adduct of 0.82 mol of TMP, 0.27 mol of pentaerylthritol and 2.42 mols of ethylene oxide are esterified with 74 g. of phthalic anhydride at a temperature of 225–250 degrees C. in an inert gas atmosphere. The resulting ester has an acid number of 0.6 and an hydroxyl number of 435.

The esters of the present invention find important utility, as stated above, in the production of rigid polyurethane foams. They have other utilities as well, for instance, as plasticizers for various resins and plastics; and as intermediates for the production of other resins and chemical compounds as, for example, resins produced by reacting epoxy resins with minor proportions of said esters.

As illustrative of the use of esters made in accordance with the present invention for the production of rigid polyurethane foams, the following examples are given:

*Example A*

A prepolymer is made by adding 20 parts of the ester of Example 6 to 80 parts tolylene diisocyanate in a flask with good stirring and the maintenance of a dry atmosphere. The temperature is kept below 100 degrees C. by cooling. After cooling to room temperature, the prepolymer is incorporated into the following formula:

| | Parts by weight |
|---|---|
| Ester of Example 6 | 108 |
| Prepolymer | 100 |
| Silicone X 521 (Union Carbide Corp.) | 0.5 |
| Dibutyl tin dilaurate (Union Carbide Corp. stabilizer P 22) | 0.3 |
| Freon 11 | 33 |

The ester, silicone X 521 (coupler or surface active agent) and dibutyl tin dilaurate (catalyst) are premixed until homogeneous. The prepolymer and Freon 11 are premixed. The prepolymer premix is added to the ester premix and mixed thoroughly for about 30 seconds before pouring into the mold. The mixture is then allowed to expand. In an alternative technique, the ester premix, prepolymer and Freon 11 are passed through separate lines into a mixing head.

Example B

In this example, the one shot technique is utilized, no prepolymer being employed.

| | Parts by weight |
|---|---|
| Ester of Example 9 | 71 |
| Tolylene diisocyanate | 40 |
| Silicone X 520 (Union Carbide Corp.) | 0.3 |
| N,N,N,N-tetramethyl-1,3-butanediamine | 15 |
| Freon 11 | 15 |

The ester, silicone X 520 and N,N,N,N-tetramethyl-1,3-butanediamine are premixed and there is added thereto a premix of the tolylene diisocyanate and Freon 11. After thorough mixing for about 30 seconds the mixture is poured into a mold and allowed to expand. Alternatively, this system can be foamed as a three component system (ester premix, tolylene diisocyanate and Freon 11) in a conventional foaming machine.

The rigid foams produced as described above were nonfriable and had excellent properties. Tests thereof made in comparison with a rigid foam produced from a typical branched chain ether by placing them in an oven at 67 degrees C. at 100% humidity for several days showed that the foam made from the commercial branched chain ether exhibited gross distortion and a large gain in weight whereas, by way of sharp contrast, the foams made with the esters of the present invention exhibited no distortion and only slight gains in weight.

Where the polyesters of our invention are used for the production of the rigid polyurethane foams, organic polyisocyanates, usually diisocyanates alone or in admixture with small amounts, of the order of 5 to 10% or more of triisocyanates, catalysts, stabilizers, coupler, emulsifying agents and the proportions of water (where such is used) utilized in conjunction therewith are employed in accordance with procedures per se known in the art. Among such organic polyisocyanates are, for instance, tolylene diisocyanate (in commercial form it is usually a mixture containing about 80% of the 2,4 isomer and 20% of the 2,6 isomer), hexamethylene diisocyanate, P-phenylene diisocyanate, triphenylmethyl triisocyanate and benzene-1,3,5-triisocyanate. Among the catalysts are N-ethyl morpholine, dimethylethanolamine and triethylamine. Among the emulsifying agents, which may be of anionic or nonionic character, may be mentioned ethylene oxide reaction products with sorbitan esters such as sorbitan monooleates, sorbitan monostearate and sorbitan monopalmitate; ethylene oxide reaction products with alkyl phenols; and mixed emulsifiers such as those sold under the designation Witco 77–86 by Witco Chemical Company. Reference is made to such patents as No. 2,779,689 for disclosures of other organic diisocyanates, catalysts, emulsifying agents, proportions of reactants to produce the polyurethane foams, and for other information generally concerning known techniques of producing the foams from esters. Other patents disclosing methods of producing polyurethane foams include, for instance, Nos. 2,785,739; 2,787,601; 2,788,335, and the foaming techniques disclosed therein can broadly be utilized in forming the rigid polyurethane foams from the novel ester compositions of our invention.

What we claim as new and desire to protect by Letters Patent of the United States is:

1. An ester comprising a reaction product of (a) polycarboxylic acid component of which aromatic dicarboxylic acid constitutes at least 25% by weight, with (b) an ethylene oxide adduct of an aliphatic polyhydric alcohol, said aliphatic polyhydric alcohol containing from 3 to 6 hydroxyl groups, said adduct containing, for each mol of said aliphatic polyhydric alcohol, such a number of mols of ethylene oxide whereby said adduct contains from 10 to 20 milli-equivalents, per gram, of hydroxyl groups, said ester having an hydroxyl number between about 280 and about 550.

2. An ester comprising a reaction product of (a) polycarbarboxylic acid component of which phthalic anhydride constitutes at least 25% by weight, with (b) an ethylene oxide adduct of an aliphatic polyhydric alcohol, said aliphatic polyhydric alcohol containing from 3 to 6 hydroxyl groups, said adduct containing, for each mol of said aliphatic polyhydric alcohol, such a number of mols of ethylene oxide whereby said adduct contains from 10 to 20 milli-equivalents, per gram, of hydroxyl groups, said ester having an hydroxyl number between about 280 and about 550.

3. An ester comprising a reaction product of (a) polycarboxylic acid component of which phthalic anhydride constitutes at least 40% by weight, with (b) an ethylene oxide adduct of an aliphatic polyhydric alcohol, said aliphatic polyhydric alcohol containing from 3 to 6 hydroxyl groups, said adduct containing, for each mol of said aliphatic polyhydric alcohol, such a number of mols of ethylene oxide whereby said adduct contains from 10 to 20 milli-equivalents, per gram, of hydroxyl groups, said ester having an hydroxyl number between about 320 and about 500.

4. An ester comprising a reaction product of (a) polycarboxylic acid component of which aromatic dicarboxylic acid constitutes at least 25% by weight, with (b) an ethylene oxide adduct of trimethylolpropane in which the ethylene oxide content is from about 0.5 mol to not substantially in excess of 3 mols for each mol of the trimethylolpropane, said adduct containing from 10 to 20 milli-equivalents, per gram, of hydroxyl groups, said ester having an hydroxyl number between about 280 and about 550.

5. An ester comprising a reaction product of (a) polycarboxylic acid component of which phthalic anhydride constitutes at least 40% by weight, with (b) an ethylene oxide adduct of trimethylolpropane in which the ethylene oxide content is from about 0.5 mol to not substantially in excess of 3 mols for each mol of the trimethylolpropane, said adduct containing from 10 to 20 milli-equivalents, per gram, of hydroxyl groups, said ester having an hydroxyl number between about 320 and about 500.

References Cited by the Examiner

UNITED STATES PATENTS 2,866,774  12/1958  Price _____ 260—2.5 X

LORRAINE A. WEINBERGER, *Primary Examiner.*

LEON ZITVER, *Examiner.*

R. E. MASSA, T. L. GALLOWAY,
*Assistant Examiners.*